United States Patent [19]

Moreau

[11] Patent Number: 4,943,063
[45] Date of Patent: Jul. 24, 1990

[54] CONVERTIBLE COMESTIBLE

[76] Inventor: Claude R. M. Moreau, 85-06 Sixtieth Ave., Elmhurst, N.Y. 11373

[21] Appl. No.: 330,055

[22] Filed: Mar. 29, 1989

[51] Int. Cl.⁵ .............................................. A63F 9/10
[52] U.S. Cl. .............................. 273/157 R; 273/160; 426/104
[58] Field of Search .................... 273/157 R, 160; 426/104

[56] References Cited

U.S. PATENT DOCUMENTS

| | | | |
|---|---|---|---|
| 1,229,580 | 6/1917 | Brown | 273/157 R |
| 3,701,214 | 10/1972 | Sakamoto | 273/160 X |
| 3,779,558 | 12/1973 | Moreau | 273/157 R |

FOREIGN PATENT DOCUMENTS 2703900 8/1978 Fed. Rep. of Germany ...... 426/104
3806 9/1878 United Kingdom ............ 273/157 R Primary Examiner—Edward M. Coven
Assistant Examiner—Raleigh W. Chin

[57] ABSTRACT

A convertible comestible comprising a food bar divisible into a plurality of edible portions, which can be repositioned to form a three-dimensional object such as a toy. The edible portions have shapes which are close-fitting and interrelating with one another to form one or more three-dimensional objects when separate from each other. Wrapping means may include a foil wrap for inner covering and an illustrated paper envelope as an outer cover. The food bar may be integral with separable edible portions or separated to begin with, or a combination of the two. The edible portions are generally sized to fit inside one's mouth, although some maybe bigger than others and may require more than one bite to be eaten.

22 Claims, 2 Drawing Sheets

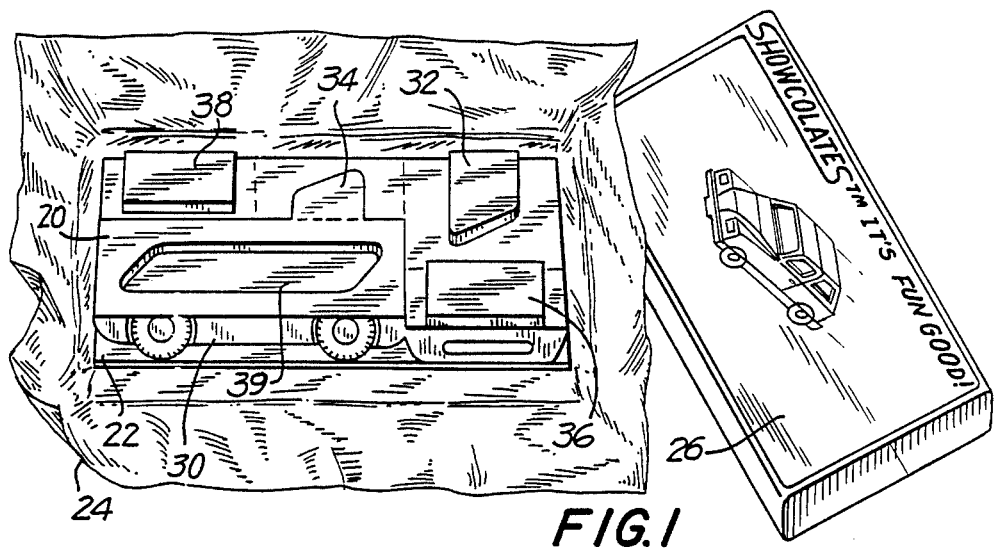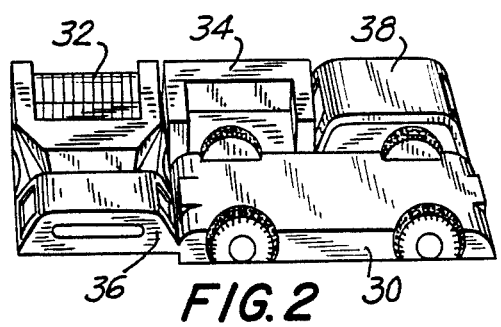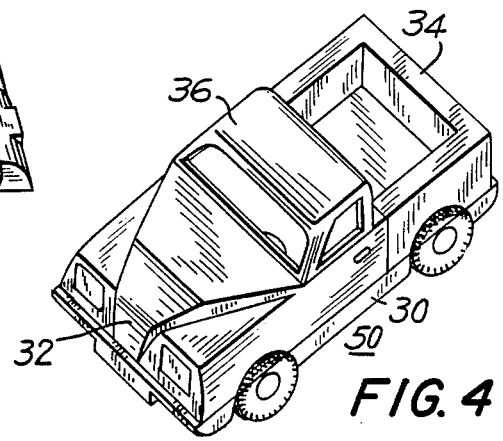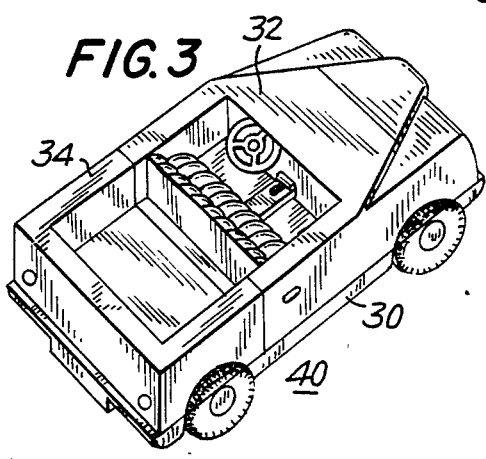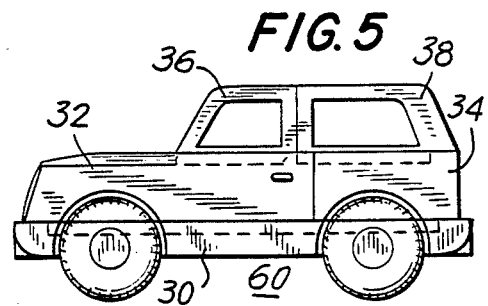

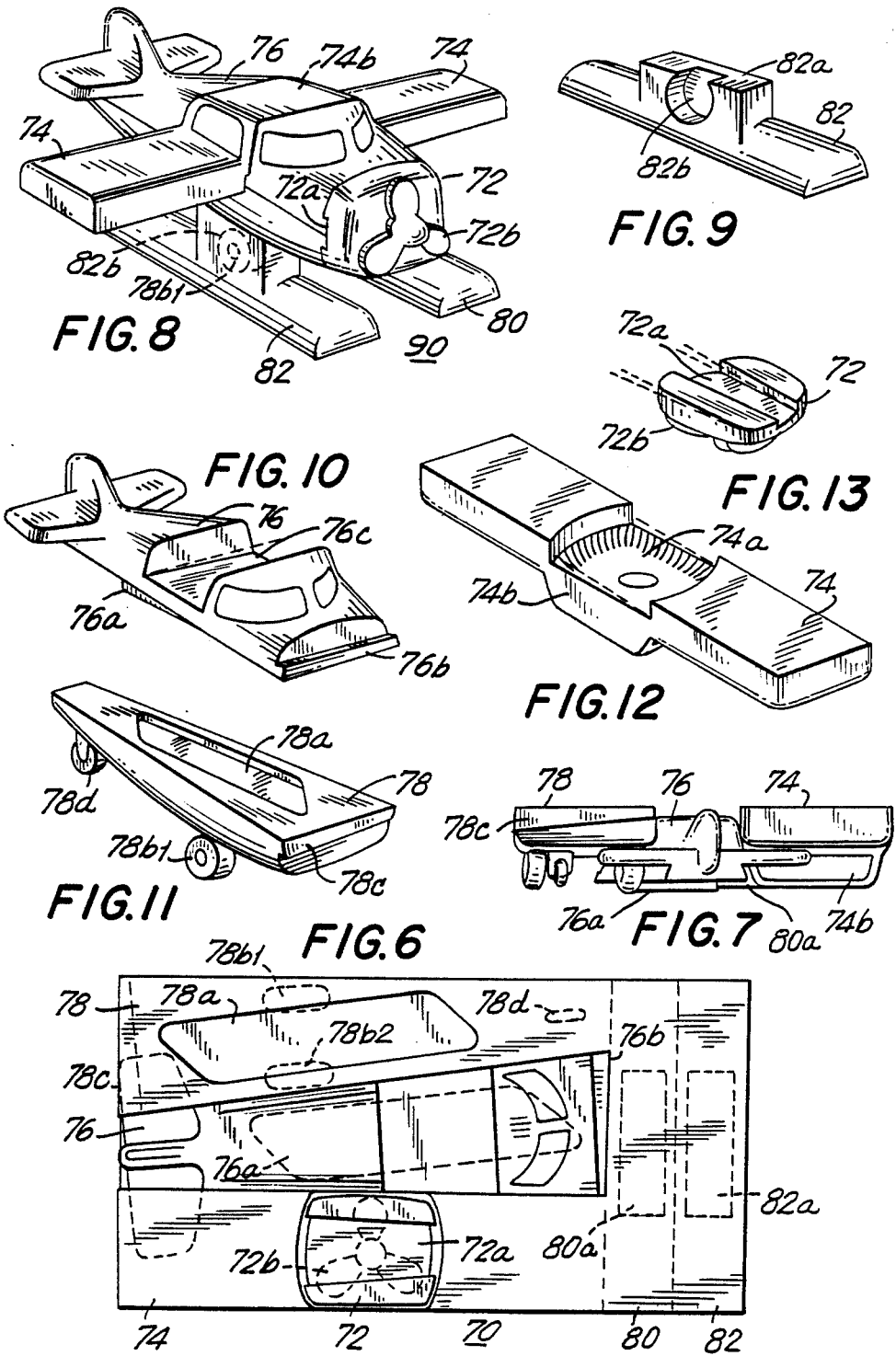

4,943,063

CONVERTIBLE COMESTIBLE

BACKGROUND OF THE INVENTION

1. Field of the Invention

This invention generally relates to recreational and entertainment playthings such as construction sets, 3-D puzzles and transformable toys: and more particularly to processed comestibles made of moldable foodstuff which are convertible into playthings.

2. Description of the Related Art

Entertainment playthings such as construction sets, 3-D puzzles and transformable toys are typically fabricated of substantially rigid materials such as plastic, metal, wood, cardboard and other nonsoluble indigestible materials. The general idea behind such playthings is to provide a finite construction object in a problem-solving form for recreational and entertainment purposes.

Such playthings do not usually provide edible rewards past playtime and are not pleasurable beyond the psychological satisfaction resulting from bringing the device to its completion. Once built, the entertainment activity is essentially over and the device is either left in the finished state or disassembled.

As an example, the present inventor's U.S. Pat. No. 3,779,568 discloses a puzzle system having uniquely-shaped pieces which can be assembled either as a three-dimensional toy or as a two-dimensional jigsaw-type puzzle.

Moreover, satisfaction being a relatively short-lived emotion, to rebuild the same plaything a second or third time is not as much fun as is experienced the first time. In any event, it would be desirable for a plaything with temporary entertainment value to be intrinsically edible and provide health and nutritional qualities which are additionally satisfying as well.

SUMMARY OF THE INVENTION

It is a general object of the invention to provide comestible products with play value in addition to nutritional and health qualities.

Another object of the invention is to provide food products made of foodstuffs popular with children and teens as well as with many adults, such as confectioneries, candies, cookies, chocolate, sugar cubes and chewing gum, etc.

Still another object of the invention is to provide a trick-device for parents to entice children into taking some food staples and medicinal substances which they would not readily accept otherwise, such as cereals, vitamins and drugs.

A further object of the invention is to provide a foodstuff of compact geometric configuration which is practical and easily packageable.

Yet another object of the invention is to provide a comestible which transcends plain food eating habits and combines with recreational playthings to create a snack/pastime with multi-gratifying values, unlike anything else in the food and toy industries.

In keeping with these objects and others which will become apparent hereinafter, one feature of the invention resides in a convertible comestible which comprises a solid food bar divisible into a plurality of edible portions, which can be repositioned to form a three-dimensional object such as a toy, which can be played with for a while and be eaten afterwards, thereby serving different functions and fulfilling multiple needs.

Another feature of the invention are edible portions having shapes which are close-fitting and interrelating with one another to form one or more three-dimensional objects when put together.

A further feature of the invention are means for wrapping and preserving the food bar. Such wrapping means may include a foil wrap for inner covering and an illustrated paper envelope as an outer cover.

In different embodiments of the invention. The convertible comestible is in the form of a solid one-piece unit which can be split up by the consumer into a plurality of edible portions, or as a food bar fabricated as discrete edible block-portions separate from one another and individually molded, or as a combination of both.

In the embodiment& of the invention where the food bar is fabricated as an integral one-piece unit, the separation of the food bar into discrete block-portions is facilitated by deep grooves along which the bar is divisible and can easily be broken up. Such grooves are formed by the edges of the portions where they connect and where the thickness of the bar is considerably weakened so as to enable the consumer to snap them into discrete sections to form individually edible portions. The edible portions are generally sized to fit inside one's mouth, although some maybe bigger than others and may require more than one bite to be eaten.

In the embodiment of the invention where the food bar is fabricated as discrete individual blocks the blocks being made of different edible substances and, the wrapping means help in maintaining them together in a bar-like configuration.

A feature of that embodiment of the invention is a cardboard base which provides support for the separate block-portions and maintains them at an even plane level.

In a preferred embodiment of the invention, the food bar is made of a consistent, moldable, chewable and digestible foodstuff. The term "foodstuff" is intended to signify anything which can be ingested and, as such, may include chewing gum, vitamin compounds, biodegradable gelatin capsule containers, and other edibles with a film coated surface for easy swallowing and clean handling, including certain kinds of chocolate and drugs.

The three-dimensional objects to be formed with the edible block-portions can be virtually anything, including representation of known characters and familiar objects of everyday life, people and animals, etc.

The novel features which are considered as characteristic of various embodiments of the invention are set forth in particular in the appended claims. The embodiments of the invention themselves however both as to construction and method of operation, together with additional objects and advantages thereof, best will he understood from the following description of the preferred embodiments when read in connection with the figures of the accompanying two sheets of drawings.

BRIEF DESCRIPTION OF THE DRAWINGS

FIG. 1 (first sheet) is a perspective view of a convertible comestible and its inner and outer wrapping in accordance with one embodiment of the invention: a food bar molded into constituent portions which when separated from each other, may be assembled into three-dimensional multiple objects, in this case three different vehicles.

FIG. 2 is a perspective view of the other side of the food bar shown in FIG. 1 (rotated 180 degrees), showing the contours of various constituent portions which, when separated, become parts of vehicles.

FIG. 3 is a perspective view of a convertible car which may be assembled from the separated parts of the food bar shown in FIG. 1.

FIG. 4 is a perspective view of a pickup truck which may be assembled from the separated parts of the food bar shown in FIG. 1.

FIG. 5 is a perspective view of a sedan which may be assembled from the separated parts of the food bar shown in FIG. 1. The dotted lines in FIG. 5 show the raised mating platforms interlocked with their mating counterparts when assembled together.

FIG. 6 (bottom of second sheet) is a plan view of the top side of a convertible comestible in accordance with the embodiment of the invention in which the food bar is molded as a solid one-piece main portion with two separately molded portions removably nestled in predetermined niches to form contiguous portions which may be assembled into a three-dimensional object, an airplane/hydroplane, with underlying features shown in dotted outline.

FIG. 7 is the left side view of FIG. 6 showing how the constituent portions of the food bar are assembled into a food bar configuration.

FIG. 8 is a perspective view of the hydroplane which may be assembled from the parts of the food bar shown in FIG. 6.

FIG. 9 is a perspective view of one of the floats of the hydroplane from the parts of the food bar shown in FIG. 6 which may be removed to form an airplane.

FIG. 10 is a perspective view of the top fuselage of the hydroplane which may be assembled from the parts of the food bar shown in FIG. 6.

FIG. 11 is a perspective view of the bottom fuselage of the hydroplane which may be assembled from the parts of the food bar shown in FIG. 6.

FIG. 12 is a perspective view of the wing of the hydroplane which may be assembled from the parts of the food bar shown in FIG. 6.

FIG. 13 is a perspective view of the propeller and dovetail of the hydroplane which may be assembled from the parts of the food bar shown in FIG. 6.

DESCRIPTION OF THE PREFERRED EMBODIMENTS

Referring to FIG. 1, a convertible comestible in accordance with the preferred embodiment of the invention is disclosed as a an integral food bar 20 whose constituent portions when separated along grooves (some of which are shown as dotted lines) can be converted into one of three different kinds of vehicles, a convertible car, a pickup truck and a sedan. Food bar 20 may be made from any foodstuff.

Food bar 20 is supported by a cardboard base 22 and wrapped in metal foil 24. The foil wrapped food bar 20 then is wrapped in an outer paper wrapper 26. The paper wrapper 26 has an illustration of one of the vehicles Which may be assembled from the food bar 20. Printed on the inside of paper wrapper 26 are assembly instructions for the three vehicles.

Food bar 20 (FIGS. 1 and 2) comprises the following distinctively shaped constituent portions of food bar 20 which interrelate with each other to form a three-dimensional object: body 30, engine and seat 82, truck bed 84, top front 36 and top rear 38. FIG. 2 shows the contoured sides of these constituent portions, and the deep grooves which permit them to be separated into edible discrete block-portions.

An area 39 (FIG. 1) is provided on the surface of body 30 for a logo.

Three of the constituent portions of food bar 20, when separated, may be assembled in the form of a convertible car 40 as shown in FIG. 8. They are body 30, engine and seat 32 and truck bed 34.

Four of the constituent portions of food bar 20, when separated, may be assembled in the form of a pickup truck 50 as shown in FIG. 4. They are body 30, engine and seat 32, truck bed 34 and top front 36.

Five of the constituent portions of food bar 20, when separated, may be assembled in the form of a sedan 60 as shown in FIG. 5. They are body 30, engine and seat 32, truck bed 34, top front 36 and top rear 38.

The vehicles shown in FIGS. 3–5 may be successively assembled from the separated constituent portions of food bar 20 (FIGS. 1 and 2) in the following steps.

Step 1. Engine and seat 32 (FIG. 3) is positioned on body 30 followed by truck bed 4 to form convertible car 40.

Step. 2. Top front 36 (FIG. 4) is then positioned on engine and seat 32 to form pickup truck 50.

Step 3. Top rear 38 (FIG. 5) is then positioned on body 30 to form sedan 60.

Referring to FIGS. 6 and 7 (sheet two), an alternate embodiment of the invention is food bar 70 which comprises separate constituent portions which are packaged and wrapped together like food bar 20 of FIG. 1. That is, the constituent portions of food bar 70 are arranged together on a cardboard base, wrapped in foil and then wrapped in a paper wrapper as described for food bar 20. Food bar 70 may be made from any foodstuff.

Food bar 70 comprises three separate individually molded, distinctively shaped constituent portions, two of which (72 and 76) being removably nestled within the main portion (74, 78, 80, 82) interrelate with each other to form three-dimensional multiple objects: propeller dovetail 72, wings 74, top fuselage 76, bottom fuselage 78, left float 80 and right float 82. These constituent portions may be assembled into a hydroplane or airplane 90 (FIG. 8).

Propeller dovetail 72 (FIGS. 6 and 13) comprises female dovetail 72a and propeller 72b.

Wings 74 (FIGS. 6, 7 and 12) comprise space 74a, under the cockpit adapted to receive and support propeller dovetail 72, and cockpit 74b.

Top fuselage 76 (FIGS. 6, 7 and 10) comprises mating platform 76a, half male dovetail 76b and space 76c adapted to receive wings 74.

Bottom fuselage 78 (FIGS. 6, 7 and 11) comprises mating depression 78a, corresponding in shape to mating platform 76a which are adapted to mate together to connect top fuselage 76 and bottom fuselage 78 together, right and left tires 78b1 and 78b2, half male dovetail 78c and tail wheel 78d.

A reversible float 82 (FIGS. 6 and 9) comprises a float connecting section 82a with a circular depression 82b adapted to fit either tire as shown in 78b1 (FIG. 8) to connect floats 80 and 72 with bottom fuselage 78.

The hydroplane 90 (FIG. 8) may be assembled from the separate constituent portions of food bar 70 (FIGS. 6 and 7) in the following steps.

Step I. The mating raised platform 76a (FIG. 10) of top fuselage 76 is inserted into the matching mating depression 78a (FIG. 11) of bottom fuselage 78.

Step 2. Female dovetail 72a of propeller dovetail 72 (FIG. 13) is slid over the now contiguous half male dovetails 76b and 78c (FIGS. 10 and 11) to further connect top fuselage 76 with bottom fuselage 78 and mount the propeller 72b on the hydroplane 90.

Step. 3. Space 74a (FIG. 12) of wings 74 is mounted over space 76c (FIG. 10) to connect wings 74 to top fuselage 76 and complete the construction of airplane 90 (FIG. 8) (without the floats).

Step 4. The left and right floats 80 and 82 (FIGS. 6 and 8) are connected to the bottom fuselage 78 (FIG. 11) via the tires 78b1 and 78b2 and the corresponding depressions 82b and 80b to complete the construction of hydroplane 90 (FIG. 8).

Both embodiments of the invention (FIGS. 1-5 and FIGS. 6-13) can also be made as discrete individually molded constituent portions.

What is claimed is:

1. A convertible comestible comprising a processed foodstuff moldable into a three-dimensional geometric configuration as a food bar, said food bar being made of a plurality of distinctly different shaped and sized constituent portions being separable into a number of three-dimensionally complimentarily sculptured separate portions to interrelate with one another in a permutable three-dimensional configuration, said separate portions affording multi-level grouping in sequential arrangements with contiguous interfacing and occlusive interlocking to form a three-dimensional object in a given configuration.

2. The convertible comestible according to claim 1, wherein said constituent portions are fitted to form at least one more three-dimensional object with at least one additional separate portion in an accretive configuration.

3. The convertible comestible according to claim 1, wherein said processed foodstuff is a one-piece solid food bar comprising an aggregate number of distinctively shaped and sized constituent portions; and further comprising means for wrapping and preserving said processed foodstuff.

4. The convertible comestible according to claim 3, wherein said solid food bar comprises a plurality of deep grooves formed by the edges of said distinctively different shaped and sized constituent portions where they connect and where the reduced thickness of said processed foodstuff makes said solid food bar easily breakable.

5. The convertible comestible according to claim 4, wherein said edges of said distinctively different shaped and sized constituent portions are generally rectilinear and contiguous to one another when forming said food bar.

6. The convertible comestible according to claim 1, wherein each of said constituent portions has at least one interfacing side with mating means matching and interlocking with the mating means of at least one other of said constituent portions, said mating means being displayed on the same side of said food bar.

7. The convertible comestible according to claim 6, wherein said constituent portions interface, male, and interlock horizontally, vertically, obliquely, and in combination when forming said three-dimensional object.

8. The convertible comestible according to claim 6, wherein some of said constituent portions are obliquely positioned and have to be angled in order to create contiguous edges to form a solid food bar; and further having mating constituent potions and mating means equally adjusted for compensation when forming said three-dimensional object.

9. The convertible comestible according to claim 1, wherein some of said constituent portions have at least one interfacing side with mating means being displayed on one side; and the rest of said constituent portions have at least one interfacing side with mating means being displayed on the other side of said food bar.

10. The convertible comestible according to claim 1, wherein said food bar includes at least one discrete individually molded portion removably nestled in a predetermined niche located within the main portion of said food bar; and further comprising means for maintaining said nestled portion together with said main portion of said food bar.

11. The convertible comestible according to claim 1, wherein each of said constituent portions is a discrete, individually molded food block shaped to complement one another to form a three-dimensional geometric configuration as a food bar in a given configuration, said food blocks being convertibly, positionable to form at least one three-dimensional object; and further comprising means for wrapping and preserving said processed foodstuff, and for supporting and maintaining the separate blocks together in said food bar configuration.

12. The convertible comestible according to claim 11, wherein said processed foodstuff comprises said constituent portions which are made of different edible substances.

13. The convertible comestible according to claim 11, wherein said discrete food blocks lie in a common plane and have relatively even thickness to form said food bar with an even plane.

14. The convertible comestible according to claim 1, wherein said constituent portions are generally small enough to fit inside one's mouth.

15. The convertible comestible according to claim 1, wherein one of said constituent portions of said food bar provides space for a logo; and further some other areas may provide spaces for engraving.

16. The convertible comestible according to claim 1, wherein said three-dimensional obJect is easily recognizable by its shape when fully formed.

17. The convertible comestible according to claim 16, wherein said three-dimensional obJect can easily be identified as a plaything.

18. The convertible comestible according to claim 1, wherein said processed foodstuff is composed of a homogeneous, moldable, edible, chewable, digestable substance.

19. The convertible comestible according to claim 1, wherein said three-dimensional geometric configuration of said food bar can be any volume which is suitable for packaging.

20. A convertible comestible comprising a processed foodstuff moldable into a three-dimensional geometric configuration as a food bar, said food bar being made of a plurality of constituent portions being separable into a number of separate portions distinctly shaped to interrelate with one another, said separate portions being positionable in a given arrangement to form a three-dimensional object, wherein each of said constituent portions has at least one interfacing side with mating means matching and interlocking with the mating means of at least one other of said constituent portions, said mating means being displayed on the same side of said food bar or alternatively partly on one side and partly on the other side of said food bar, and wherein said constituent portions have raised and depressed platforms uniquely shaped to mate and interlock with one another selectively and occlusively at every stage of arrangement when forming said three-dimensional object.

21. A method for reconfiguring a processed food stuff comprising the steps of:
(a) molding said processed foodstuff into a compact, integral, packageable geometric configuration composed of three-dimensional distinctively sculptured constituent portions;
(b) separated said processed foodstuff into a plurality of constituent portions; and
(c) putting together said separated constituent portions to form one of a plurality of three-dimensional objects which can be used as a temporary plaything before being eaten.

22. The method according to claim 21, wherein
(a) said molding and separating steps are performed simultaneously by molding said constituent portions as discrete, individually molded edible blocks.
(b) assembling together the separated constituent portions into a given arrangement to form a compact, integral, packageable geometric configuration.

* * * * *

UNITED STATES PATENT AND TRADEMARK OFFICE
CERTIFICATE OF CORRECTION

PATENT NO. : 4,943,063
DATED : July 24, 1990
INVENTOR(S) : Claude R. M. Moreau It is certified that error appears in the above-identified patent and that said Letters Patent is hereby corrected as shown below:

Column 2, line 11, change " T " to -- t --.
Column 2, line 18, delete " & "
Column 2, lines 32-33, change "the blocks being made of different edible substances and" to --which maybe made of the same, or different edible substances--.
Column 2, line 63, read "which" instead of --Which--.
Column 4, line 1, change "82" to --32--.
Column 4, line 2, change "84" to --34--.
Column 4, line 10, change "8" to --3--.
Column 4, line 14, in 30 use "zero" instead of letter --O--.
Column 4, line 65, change "72" to --82--.
Column 5, line 65, change "male" to --mate--.
Column 6, line 5, change "potions" to --portions--.
Column 6, line 26, delete coma.
Column 6, line 47, in object, change "J" to --j--.
Column 6, line 50, in object, change "J" to --j--.
Column 8, line 1, change "separated" to --separating--.

Signed and Sealed this

Fourteenth Day of January, 1992

*Attest:*

HARRY F. MANBECK, JR.

*Attesting Officer*  *Commissioner of Patents and Trademarks*